United States Patent Office 2,886,536
Patented May 12, 1959

2,886,536
DUAL FUNCTION CATALYSTS

Paul H. Emmett, Baltimore, Md., assignor to Gulf Research & Development Company, Pittsburgh, Pa., a corporation of Delaware No Drawing. Application March 13, 1956
Serial No. 571,130

8 Claims. (Cl. 252—455)

This invention relates to dual function catalysts and particularly to a method for preparing dual function catalysts for the conversion of hydrocarbons.

In processes for the conversion of hydrocarbons to more valuable products two or more reactions are often required to proceed from the charge stock to the desired final product. In some instances a first reaction is required to form an intermediate compound which is a necessary reactant in the second reaction. Frequently the two reactions have entirely different mechanisms and are catalyzed by catalysts of fundamentally different types. In this specification the term "dual function catalyst" is used to designate catalysts having two or more components, each of which is effective alone as a catalyst, and both of which are in an exposed active condition in the final composite.

The dual function catalysts used in the conversion of hydrocarbons consist of a first solid catalytic material, hereinafter referred to as the primary catalyst, of the adsorptive type having active acid sites on its surface on which a secondary catalytic component has been incorporated. The primary catalysts catalyze reactions proceeding by mechanisms involving the formation, alteration, and destruction of carbonium ions. Cracking, isomerization, alkylation, and polymerization of hydrocarbons are reactions of this type. The second function of the dual function catalysts is to catalyze reactions such as hydrogenation and dehydrogenation which do not depend on the formation of carbonium ions. The secondary catalyst accelerates the non-carbonium ion type reaction. Frequently the secondary component of the dual function catalyst will also accelerate the reactions in which carbonium ions are formed, perhaps by speeding the alteration of the carbonium ions. Other reactions, such as those involving ring closure to form aromatic compounds may or may not proceed by mechanisms requiring the formation of carbonium ions, but have been found to be catalyzed by dual function catalysts.

The dual function catalysts are generally prepared by the incorporation in a primary catalyst, preferably an active cracking catalyst of the adsorptive type, a component which has catalytic properties enhancing desired types of reactions. For example, the secondary component may be added to a cranking catalyst to improve the aromatization, isomerization, hydrogenation-dehydrogenation, hydrocracking, or hydrodesulfurization catalyzing properties of the catalyst. Heretofore, the secondary components of the catalysts have been incorporated by simple impregnation with salts of the secondary component or by mulling mixtures of the primary and secondary catalytic materials. These procedures often cause the acid sites of the primary catalysts to be covered, thereby seriously decreasing the activity of the resultant dual function catalyst. The reduction in activity is usually most severe for the primary function of the catalysts.

In some instances, the dual function catalysts prepared by the methods heretofore available cause the formation of large amounts of gas and coke, with a corresponding reduction in the production of liquid products, when used for the conversion of hydrocarbons. In other instances the ratio of branched to straight chain hydrocarbons in the product of the conversion process using the dual function catalysts heretofore available is substantially lower than the ratio obtained by the cracking, for example, in the presence of a cracking catalyst not modified with a secondary component. The effect of adding a secondary component to a solid primary catalyst having acid sites on its surface varies widely and depends on the particular secondary catalyst incorporated on the acid support to enhance the activity of the catalyst for the second function.

This invention resides in a method of preparing a novel dual function catalyst by blocking the acid sites on the surface of a primary catalyst with a blocking compound and impregnating the thus blocked catalyst with a secondary component selected to enhance the catalytic properties of the resultant catalyst for desired reactions. Following the impregnation the material blocking the acid sites is removed from the catalyst to expose the acid sites, thereby providing a dual function catalyst in which the secondary component is positioned on the surface of the catalyst at points other than the acid sites on the primary catalyst.

The primary catalysts most useful for the preparation of the dual function catalysts of this invention are solid porous materials having a large surface area in addition to the acid sites necessary for the primary function of the catalysts. The large surface area allows substantial quantities of the secondary catalyst to be supported on the primary catalyst. Preferred primary catalysts are hydrocarbon cracking catalysts which are readily available commercial catalysts. Silica-alumina cracking catalysts containing a major proportion of silica and a minor proportion of alumina are especially suitable. Other cracking catalysts, such as composites of silica and magnesia, silica and zirconia, or composites of those catalysts containing minor amounts of promoters such as beryllia, thoria, zirconia, titania, etc., can be used.

For purposes of illustration only, methods of preparing silica-alumina cracking catalysts suitable for use as the primary catalyst are hereinafter described in a general manner. The processes described are merely typical, well-known processes for the preparation of silica-alumina cracking catalysts.

Silica-alumina composites can be prepared by coprecipitation or cogellation of silica and alumina from aqueous solutions such as by mixing aqueous solutions of sodium silicate and aluminum sulphate in the presence of sufficient acid, for example, hydrochloric, or sulfuric acid, to form a precipitate. Another method of producing the primary silica-alumina catalysts is the impregnation of a silica gel with a salt of aluminum followed by the conversion of the aluminum salt to alumina. One method for the conversion is to precipitate aluminum hydroxide with ammonium hydroxide, and then heat the mixture to convert the hydroxide to alumina. Another method of forming the alumina is to impregnate the silica gel with a compound of aluminum such as aluminum nitrate which will decompose during subsequent heating of the impregnated gel. Composites of silica and alumina which are active as cracking catalysts can also be prepared by vigorously mulling separately formed gels of silica and alumina. After formation of a solid composite of silica and alumina the composite is ordinarily washed with water to remove alkali metals and anions, dried at a low temperature, for example 250° F., and calcined at 600° F. to 1500° F. Silica-alumina composites prepared by the acid activation of clays, for example, bentonite or halloysite, are also suitable primary catalysts for use in the preparation of the dual function catalysts of this invention.

The secondary catalysts incorporated in the dual function catalysts of this invention will vary widely and depend upon the process in which a catalyst is to be used. For example, if it is desired to modify the primary catalyst by increasing its activity as a hydrogenation-dehydrogenation catalyst, heavy metals such as chromium, nickel, molybdenum, tungsten, or the oxides or sulfides of those metals are incorporated in the primary catalyst. Mixtures or compounds of more than one of the metals listed above, for example, cobalt molybdate or nickel tungstate are also suitable for increasing the activity of the dual function catalyst for hydrogenation-dehydrogenation reactions. If a dual function catalyst having a high activity for catalyzing isomerization reactions is desired, the secondary catalyst incorporated in the primary catalyst is preferably a metal such as platinum, palladium, or nickel. Some of the compounds that are active catalysts for hdyrogenation-dehydrogenation reactions are also effective catalysts for other reactions. For example oxides of chromium and molybdenum also enhance the aromatization activity of the catalyst, and may be incorporated for that purpose.

The active acid sites of the primary catalyst are blocked in the process of this invention prior to the introduction of the secondary catalyst onto the primary catalyst by saturating the primary catalyst with a blocking compound which will be strongly held at the acid sites of the primary catalyst. It is important that the blocking compound remain on the acid sites when physically adsorbed material is removed from other areas before introduction of the secondary catalyst. The blocking compound held at the acid sites is said to be chemisorbed. Compounds that are selectively adsorbed only at the acid sites, thereby making removal of physically adsorbed material unnecessary, are also suitable blocking compounds. It is also important that the blocking compound be one which can be removed from the acid sites of the primary catalyst after incorporation of the secondary catalyst to uncover the acid sites without removal of the secondary catalyst. The removal of the chemisorbed blocking compound can be by washing or treatment with reagents, however, those procedures usually will result in removal of substantial quantities of the secondary catalyst. It is preferred therefore, to use a blocking compound which can be removed after the incorporation of the secondary catalyst by either oxidation or volatilization.

Organic nitrogen compounds having basic properties are preferred blocking compounds. They should be sufficiently basic to be strongly chemisorbed at the acid sites and should be sufficiently stable that they will not decompose during removal of the physically adsorbed blocking compound. It is preferred that the organic nitrogen compounds have relatively large molecules. Among the blocking compounds which can be used are alkyl amines such as butyl amine, aryl amines such as aniline, polyamines such as ethylene diamine, and particularly heterocyclic amines such as pyridine, quinoline, quinaldine, and piperidine. Quinoline is a preferred blocking compound which is strongly chemisorbed at the temperatures used for removal of the physically adsorbed quinoline. For convenience in describing the invention, the preparation of dual function catalysts by the novel process of this invention will be described using quinoline as a blocking compound.

In the preparation of the novel dual function catalysts of this invention the primary catalyst preferably is dried to a substantially constant weight to allow determination of the amount of quinoline adsorbed. The drying can be acomplished by passing a stream of nitrogen at a temperature of about 600–900° F. over the primary catalyst until the primary catalyst has reached a constant weight. The primary catalyst is then saturated with quinoline by bubbling a stream of nitrogen through quinoline, preferably heated to a temperature of about 300° F. at which the quinoline has substantial vapor pressure, and then passing the quinoline-saturated stream of nitrogen over the primary catalyst until the primary catalyst reaches a constant weight. Thereafter, the quinoline-saturated primary catalyst is flushed with pure nitrogen at a temperature of about 600–800° F. to remove physically adsorbed quinoline. The flushing is continued until the catalyst reaches a constant weight. The amount of quinoline chemisorbed on the catalyst can be determined by its increase in weight resulting from the quinoline treatment.

The amount of quinoline introduced into the catalyst will vary with the temperature employed during the quinoline treatment. An increase in temperature during the sorption step of the process will reduce the chemisorbed as well as physically adsorbed quinoline. Increases in the temperature employed during the desorption of the physically adsorbed quinoline increase the rate of desorption. At temperatures below about 400° F. the rate of desorption is very slow. At temperatures above about 800° F. there is a tendency to decompose the quinoline.

Following the removal of the physically adsorbed quinoline, the secondary catalyst component is introduced onto the primary catalyst serving as a support. The incorporation of the secondary catalyst can be effected by conventional impregnation procedures. For example, the quinolated primary catalyst can be immersed in a solution of a salt of the secondary catalyst for a long period such as about 24 hours during which the quinolated primary catalyst adsorbs the salt of the secondary catalyst from the solution. A preferred method of accomplishing the impregnation of the primary catalyst to form the dual function catalyst is to evacuate the quinolated primary catalyst after removal of physically adsorbed quinoline at a low absolute pressure, for example, about 10 millimeters of mercury absolute pressure, for a suitable period which may be of the order of 20 minutes. While the catalyst is still under the vacuum it is covered with the impregnating solution. After a short period the vacuum is broken and the catalyst, while still covered with the impregnating solution, is exposed to atmospheric pressure for a short period, for example about 10 minutes. The excess impregnating solution is drained from the catalyst and the catalyst is dried in an oven.

After impregnation of the catalyst, the quinoline chemisorbed at the acid sites of the primary catalyst is removed. This can best be accomplished by passing an oxygen-containing gas over the catalyst at a temperature of about 900–1100° F.

The dual function catalysts of this invention can be in any of the forms in which catalysts are conventionally used. If the catalyst is to be used in a fluidized process it may be in powdered or microspherical form. If it is to be used in a fixed bed or moving bed process, the catalyst can best be used in the form of macrospheres, granules, lumps or pellets. The pelleting of the catalyst can be accomplished by customary pelleting techniques either before or after the removal of the quinoline from the catalyst.

The modification of the characteristics of the dual function catalysts resulting from preparing them by the process of this invention varies with the composition of the dual function catalyst. For example, when a dual function catalyst is prepared by impregnating a silica-alumina cracking catalyst with ammonium chromate followed by calcination, catalysts prepared by the technique of this invention are more active in the conversion of cetane than catalysts prepared by conventional impregnating techniques. In addition, dual function catalysts prepared by blocking the acid sites of the cracking catalyst prior to impregnation with the chromium compound give a higher ratio of iso-paraffins to normal paraffins than catalysts prepared by direct impregnation of the cracking catalyst with ammonium chromate. The process of this invention also results in a reduced yield of gas and an increased yield of liquid product as shown by the following examples.

EXAMPLE 1

A standard synthetic silica-alumina cracking catalyst (Houdry M-46) containing about 10-15% alumina and 85-90% silica prepared by cogellation of silica and alumina followed by washing, drying and calcining at about 850° F. was used as a primary catalyst. A stream of nitrogen at about 600° F. was passed over the primary catalyst until the catalyst reached a constant weight. The stream of nitrogen was then bubbled through hot liquid quinoline at 600° F. The quinoline-containing nitrogen stream was passed over the primary catalyst until it again reached a constant weight. About 5 hours were required to saturate the primary catalyst. The quinoline saturator was then by-passed and the stream of nitrogen was passed through the primary catalyst at about 600° F. for 5 hours after which the catalyst had again reached a constant weight. About 80.2 milliequivalents of quinoline per kilogram of primary catalyst were chemisorbed by the catalyst.

53.2 grams of the quinolated primary catalyst were immersed in a solution containing 4.04 grams of $(NH_4)_2CrO_4$ in 100 cc. of distilled water for a period of 24 hours, after which the supernatant solution was decanted and the catalyst dried overnight at about 100° C. The dried catalyst was supported in a reactor to form a fixed bed of catalyst and the quinoline removed by passing a stream of pure oxygen over the catalyst for 12 hours at a temperature of 840° F. The catalyst was then flushed with nitrogen at the same temperature for several hours. Cetane was then charged to the reactor at a liquid hourly space velocity of 1 and a temperature of 854° F. The results of the conversion of the cetane are presented in Table I.

Percent conversion = 100 − % cetane in product

EXAMPLE 2

A sample of the commercial silica-alumina cracking catalyst employed as a primary catalyst in the preparation of the dual function catalyst in Example 1 was impregnated with an ammonium chromate solution of the same concentration used in Example 1. The procedure for the impregnation was substantially the same as for Example 1 except that the catalyst was not treated with quinoline. The resultant catalyst was then tested for activity by passing cetane at a liquid hourly space velocity of 1 and a temperature of 842° F. over the catalyst. The results of the conversion process are set forth in Table I.

Table I

| Example No. | 1 | 2 |
|---|---|---|
| Conversion Conditions: | | |
| Temp., ° F. | 844 | 842 |
| Liq. Hourly Space Vel., vol./vol./hr. | 1.00 | 1.00 |
| Pressure, atmospheres | 1.00 | 1.00 |
| Chemisorbed Quinoline, meq./kg. | 80.2 | |
| Cr. concentration, m. mol/gm. primary catalysts | 0.18 | 0.44 |
| Conversion, Percent | 50.8 | 41.3 |
| Conversion Products: | | |
| Gas, mols/100 mols cetane converted | 239.4 | 404.8 |
| Wt. Percent gas ($H_2$-$C_4H_{10}$) | 18.8 | 19.5 |
| Wt. Percent liquid ($C_5$-482° F.) | 22.5 | 14.9 |
| Wt. Percent coke | 2.6 | 3.6 |
| $iC_4H_{10}/nC_4H_{10}$ | 3.6 | 1.7 |
| $iC_5H_{12}/nC_5H_{12}$ | 4.0 | 1.6 |

The quinolation of a silica-alumina cracking catalyst prior to the impregnation of the catalyst with

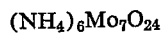

had little effect on the activity for the conversion of cetane or the yield of aromatic hydrocarbons. A dual function catalyst prepared by the quinolation technique did, however, markedly reduce gas produced as well as the amount of coke formed during the conversion process compared to a dual function catalyst of the same catalytic materials prepared by the conventional impregnating technique. The following examples compare catalysts prepared by the process of this invention and catalysts prepared by conventional techniques.

EXAMPLE 3

A 100 cc. sample of the commercial silica-alumina cracking primary catalyst prepared according to the method described in Example 1 was purged with a nitrogen stream at a temperature of 600° F. until the catalyst reached a constant weight. The primary catalyst was then quinolated for about 9 hours at 600° F. by passing a nitrogen stream containing quinoline through a bed of the catalyst. Physically adsorbed quinoline was purged from the catalyst with nitrogen for 22 hours until a constant weight was reached.

54.1 grams of the quinolated primary catalyst were immersed in 100 cc. of a solution containing 4.8 grams of $NH_46Mo_7O_{24}\cdot 4H_2O$ for 24 hours. The supernatant liquid was then decanted and the catalyst dried overnight at about 100° C. The chemisorbed quinoline was removed from the catalyst by passing a stream of oxygen at a temperature of 840° F. over the catalyst for 12 hours and the catalyst was then flushed with nitrogen for several hours prior to testing for activity in the conversion of cetane. Cetane was passed through a bed of the catalyst at a liquid hourly space velocity of 1 and a temperature of 842° F. The results of the conversion are presented in Table II.

EXAMPLE 4

A sample of the commercial silica-alumina cracking catalyst described in Example 1 was impregnated with ammonium molybdate using an ammonium molybdate solution of the same concentration and substantially the same procedure as described for Example 3 except that the acid sites of the primary catalyst were not blocked with quinoline prior to the impregnation. The catalyst was then tested for activity by passing cetane at a temperature of 838° F. and a liquid hourly space velocity of 1 over the catalyst. The results of the conversion of cetane are presented in Table II.

Table II

| Example No. | 3 | 4 |
|---|---|---|
| Conversion Conditions: | | |
| Temp., ° F. | 842 | 838 |
| Liq. Hourly Space Vel., vol./vol./hr. | 1.0 | 1.0 |
| Pressure, atmospheres | 1.0 | 1.0 |
| Chemisorbed Quinoline, meq./kg. | 119 | |
| Mo concentration, m.mol/gm. primary catalysts | 0.19 | 0.44 |
| Conversion, percent | 35.0 | 31.4 |
| Conversion Products: | | |
| Gas, mols /100 mols cracked | 286.3 | 507.1 |
| Wt. percent gas ($H_2$-$C_4H_{10}$) | 9.7 | 14.2 |
| Wt. percent liquid ($C_5$-482° F.) | 15.5 | 13.3 |
| Wt. percent coke | 3.4 | 5.3 |

The technique of this invention is useful for the preparation of reforming catalysts containing platinum supported on a silica-alumina primary catalyst. The acid site blocking technique results in reforming catalysts of higher activity, particularly higher activity for the isomerization of normal hexane at relatively low temperatures, as shown in the following examples.

EXAMPLE 5

A sample of a commercial coprecipitated silica-alumina cracking catalyst containing about 10% alumina and 90% silica was heated to a temperature of about 1000° F. and maintained at that temperature for about 9 hours. Dry nitrogen was bubbled through a flask containing quinoline at 296° F. and then passed upwardly through a bed of the silica-alumina catalyst for a period of 50 minutes after which the catalyst was flushed with pure nitrogen for 2 hours at a temperature of 600° F. 0.11 me. of quinoline per gram of catalyst were chemisorbed in this manner.

After cooling to room temperature the quinolated silica-alumina catalyst was evacuated for 20 minutes at 6 mm. of mercury absolute pressure. The vacuum system was closed and a solution of chloroplatinic acid containing 0.478% platinum was drawn into the container to cover the catalyst. The pressure rose to 30 mm. of mercury absolute and the system was allowed to stand at that pressure for 5 minutes after which the system was exposed to atmospheric pressure for 10 minutes. The excess solution of chloro-plantinic acid was filtered from the catalyst and the wet catalyst was then oven dried at about 230° F. for 24 hours. The dried catalyst was calcined overnight in the presence of air at 1000° F. and then heated for an additional 3 hours at 1100° F. to remove the quinoline from the acid sites of the primary catalyst. The final catalyst contained 0.71% platinum, as determined by X-ray fluorescent analysis.

EXAMPLE 6

A sample of the silica-alumina catalyst used in Example 5 was heated to a temperature of 1000° F. and maintained at that temperature for about 10 hours. The catalyst was cooled to room temperature and evacuated to 6 mm. of mercury absolute pressure and held at that low pressure for 20 minutes. The vacuum system was closed off and chloro-platinic acid containing 0.478% platinum was drawn into the system in a quantity sufficient to cover the catalyst. The pressure rose to about 30 mm. mercury absolute. The mixture was allowed to stand under vacuum for 5 minutes after which the system was opened to the atmosphere and held at atmospheric pressure for 10 minutes. Excess chloro-platinic acid solution was filtered from the catalyst and the wet catalyst oven dried at about 250° F. for about 24 hours. The dried catalyst was pelleted to pellets 3/16" x 3/16" using 2% polyvinyl alcohol as a binder and Aerowax C as a lubricant. The pelleted catalyst was then calcined for a period of 16 hours of which approximately 2 hours were at an average temperature of 975° F. to remove the binder and lubricant. The calcined catalyst was then calcined overnight at 1000° F. in the presence of air and heated in the presence of air to 1100° F. for an additional 3 hours. The catalyst contained 0.33% platinum.

The catalysts of Examples 5 and 6 were tested for activity in the reforming of $C_6$ hydrocarbons. A mixture of normal hexane, cyclohexane, and benzene in a 60–30–10 volume ratio was passed through a fixed bed of the catalyst at a pressure of 500 p.s.i.g., a liquid hourly space velocity of 2 volumes per hour per volume, and a hydrogen to hydrocarbon mol ratio of about 3:1. A series of constant temperature runs was made at 20° F. temperature intervals between 800–980° F.

Products from the runs were analyzed completely for hydrocarbons by means of the mass spectrometer and calculations were made to determine the conversions of both the normal hexane and the cyclohexane in the charge stock. The following assumptions were made to allow calculation of the conversions of the hydrocarbons in the charge stock to the products.

(1) Since all cyclohexane disappearance could not be accounted for by benzene appearance, it was assumed that some cyclohexane was converted to n-hexane: this was added to the charge n-hexane for purposes of calculation of conversions.

(2) The conversion of n-hexane to cyclohexane was assumed to be negligible.

(3) Traces of toluene were assumed to be equivalent to benzene.

(4) All $C_1$–$C_5$ hydrocarbons were assumed to result from n-hexane hydrocracking.

The results of the conversion of normal hexane are presented in Table III. The results of the conversion of cyclohexane are presented in Table IV.

Table III
CONVERSION OF n-HEXANE

| Temp., ° F. | Conv. to Gas, percent | | Conv. to Isomers, percent | | Total Conv., percent | |
|---|---|---|---|---|---|---|
| | Ex. 5 | Ex. 6 | Ex. 5 | Ex. 6 | Ex. 5 | Ex. 6 |
| 800 | 11.5 | 7.3 | 27.9 | 13.2 | 39.4 | 20.5 |
| 820 | 12.1 | 7.7 | 21.6 | 9.2 | 33.7 | 16.9 |
| 840 | 12.9 | 8.2 | 16.1 | 6.8 | 29.0 | 15.0 |
| 860 | 13.7 | 9.1 | 12.1 | 5.3 | 25.8 | 14.4 |
| 880 | 14.8 | 10.1 | 9.7 | 5.0 | 24.7 | 15.1 |
| 900 | 16.0 | 11.4 | 9.0 | 4.8 | 25.0 | 16.2 |
| 920 | 17.7 | 13.2 | 8.9 | 4.6 | 26.6 | 17.8 |
| 940 | 19.9 | 15.8 | 8.9 | 4.4 | 28.8 | 20.2 |
| 960 | 22.9 | 19.4 | 8.9 | 4.3 | 31.8 | 23.7 |
| 980 | 27.6 | 26.5 | 8.9 | 4.2 | 36.5 | 30.7 |

Table IV
CONVERSION OF CYCLOHEXANE

| Temp., ° F. | To n-Hexane, percent | | To Methylcyclopentane, percent | | To Benzene, percent | | Total Conv., percent | |
|---|---|---|---|---|---|---|---|---|
| | Ex. 5 | Ex. 6 | Ex. 5 | Ex. 6 | Ex. 5 | Ex. 6 | Ex. 5 | Ex. 6 |
| 800 | 17.8 | 10.6 | 44.4 | 46.0 | | | 63.4 | 53.6 |
| 820 | 18.0 | 11.4 | 36.0 | 31.4 | 1.2 | 0.2 | 55.2 | 43.0 |
| 840 | 18.4 | 12.0 | 30.6 | 24.8 | 4.2 | 2.0 | 53.2 | 38.8 |
| 860 | 18.8 | 11.8 | 26.4 | 20.6 | 7.4 | 3.6 | 52.6 | 36.0 |
| 880 | 19.6 | 13.6 | 23.6 | 18.2 | 9.6 | 4.4 | 52.8 | 36.2 |
| 900 | 20.2 | 14.2 | 21.0 | 16.4 | 10.6 | 5.2 | 51.8 | 35.8 |
| 920 | 21.2 | 15.0 | 19.2 | 17.4 | 11.4 | 5.8 | 51.8 | 38.2 |
| 940 | 22.2 | 15.8 | 17.4 | 17.0 | 11.8 | 6.0 | 51.4 | 38.8 |
| 960 | 23.8 | 16.6 | 16.0 | 17.0 | 12.0 | 6.2 | 51.8 | 39.8 |
| 980 | 25.4 | 17.2 | 15.0 | 17.0 | 11.8 | 6.4 | 52.2 | 40.6 |

As shown by Table III the dual function silica-alumina-platinum catalysts prepared by the process of this invention have a substantially higher activity for the conversion of n-hexane than the silica-alumina-platinum catalyst prepared by a conventional impregnating technique. An important advantage of the invention is the increased yield of hexane isomers particularly at low temperatures at which the yield of gas is low. Increased catalyst activity for the conversion of cyclohexane is also obtained by preparing dual function catalysts of silica-alumina-platinum by the process of this invention.

This invention provides a method for producing novel and improved dual function catalysts in which the secondary activity of the catalyst is improved with a minimum damage to the primary activity. It is especially valuable in improving dual function catalysts prepared from cracking catalysts by allowing the secondary activities of the catalyst to be altered without destroying the cracking activity.

I claim:

1. A process for the preparation of a catalyst for the isomerization of hydrocarbons comprising passing quinoline in contact with a silica-alumina composite having acid sites on its surface whereby quinoline is both physically adsorbed and chemisorbed on the composite, then passing an inert gas in contact with the composite at a temperature of about 600 to 800° F. to remove physically adsorbed quinoline selectively from the composite and leave quinoline chemisorbed at acid sites on the composite, impregnating the composite having quinoline chemisorbed thereon with a solution of chloroplatinic acid, and calcining the impregnated composite at a temperature of about 900 to 1100° F. to remove chemisorbed quinoline from the composite, thereby exposing its acid sites.

2. A process for the preparation of a catalyst for the isomerization of hydrocarbons comprising passing vapors of an organic nitrogen-containing base in contact with a silica-alumina composite having acid sites on its surface whereby the organic nitrogen-containing base is both physically adsorbed and chemisorbed on the composite, then passing an inert gas in contact with the composite at a temperature of about 600 to 800° F. to remove physically adsorbed organic nitrogen-containing base selectively from the composite and leave the organic nitrogen-containing base chemisorbed at acid sites on the composite, impregnating the thus treated composite with a solution of a platinum compound, and passing an oxygen-containing gas in contact with the impregnated composite at a temperature of about 900 to 1100° F. to remove chemisorbed organic nitrogen-containing base from the composite, thereby exposing its acid sites.

3. A process for the preparation of a catalyst for the reforming of hydrocarbons comprising passing nitrogen through hot quinoline at a temperature of about 300° to 600° F. to form a gaseous stream of nitrogen and quinoline, passing the gaseous stream of nitrogen and quinoline in contact with a silica-alumina composite having acid sites on its surface whereby quinoline is physically adsorbed and chemisorbed on the composite, then passing an inert gas in contact with the composite at a temperature of about 600° to 800° F. to remove selectively physically adsorbed quinoline from the composite and leave chemisorbed quinoline at the acid sites, thereafter impregnating the composite with a solution of chloroplatinic acid, and then passing an oxygen-containing gas in contact with the composite at a temperature of about 900° to 1100° F. to remove chemisorbed quinoline from the composite thereby exposing its acid sites.

4. A process for the preparation of a catalyst for the conversion of hydrocarbons comprising adsorbing a basic organic nitrogen-containing compound selected from the group consisting of alkyl amines, aryl amines, and heterocyclic amines on a composite, having acid sites on its surface, of silica and a metal oxide selected from the group consisting of alumina, magnesia, and zirconia; thereafter passing an inert gas in contact with the composite at an elevated temperature to purge physically adsorbed nitrogen-containing compound from the composite and leave acid sites covered with the nitrogen-containing compound; impregnating the purged composite with a salt of a metal selected from the group consisting of group VI A and group VIII of the periodic table effective in catalyzing the conversion of hydrocarbons; and passing an oxygen-containing gas at a high temperature in contact with the impregnated composite to remove the nitrogen-containing compound from the acid sites of the composite.

5. A process as set forth in claim 4 in which the composite is a composite of silica and alumina and the salt of a metal with which the composite is impregnated is a salt of platinum.

6. A process as set forth in claim 4 in which the composite is a composite of silica and alumina and the salt of a metal with which the composite is impregnated is a salt of molybdenum.

7. A process as set forth in claim 4 in which the composite is a composite of silica and alumina and the salt of a metal with which the composite is impregnated is a salt of chromium.

8. A process as set forth in claim 4 in which the basic organic nitrogen-containing compound is quinoline.

References Cited in the file of this patent

UNITED STATES PATENTS

| | | |
|---|---|---|
| 2,519,622 | Archibald et al. | Aug. 22, 1950 |
| 2,623,860 | Haensel | Dec. 30, 1952 |
| 2,650,906 | Engel et al. | Sept. 1, 1953 |
| 2,666,749 | Hoekstra | Jan. 19, 1954 |
| 2,736,689 | Stuart | Feb. 28, 1956 |